No. 725,768. PATENTED APR. 21, 1903.
A. P. PREVOST.
WEEDING TOOL.
APPLICATION FILED AUG. 11, 1902.
NO MODEL. 2 SHEETS—SHEET 1.
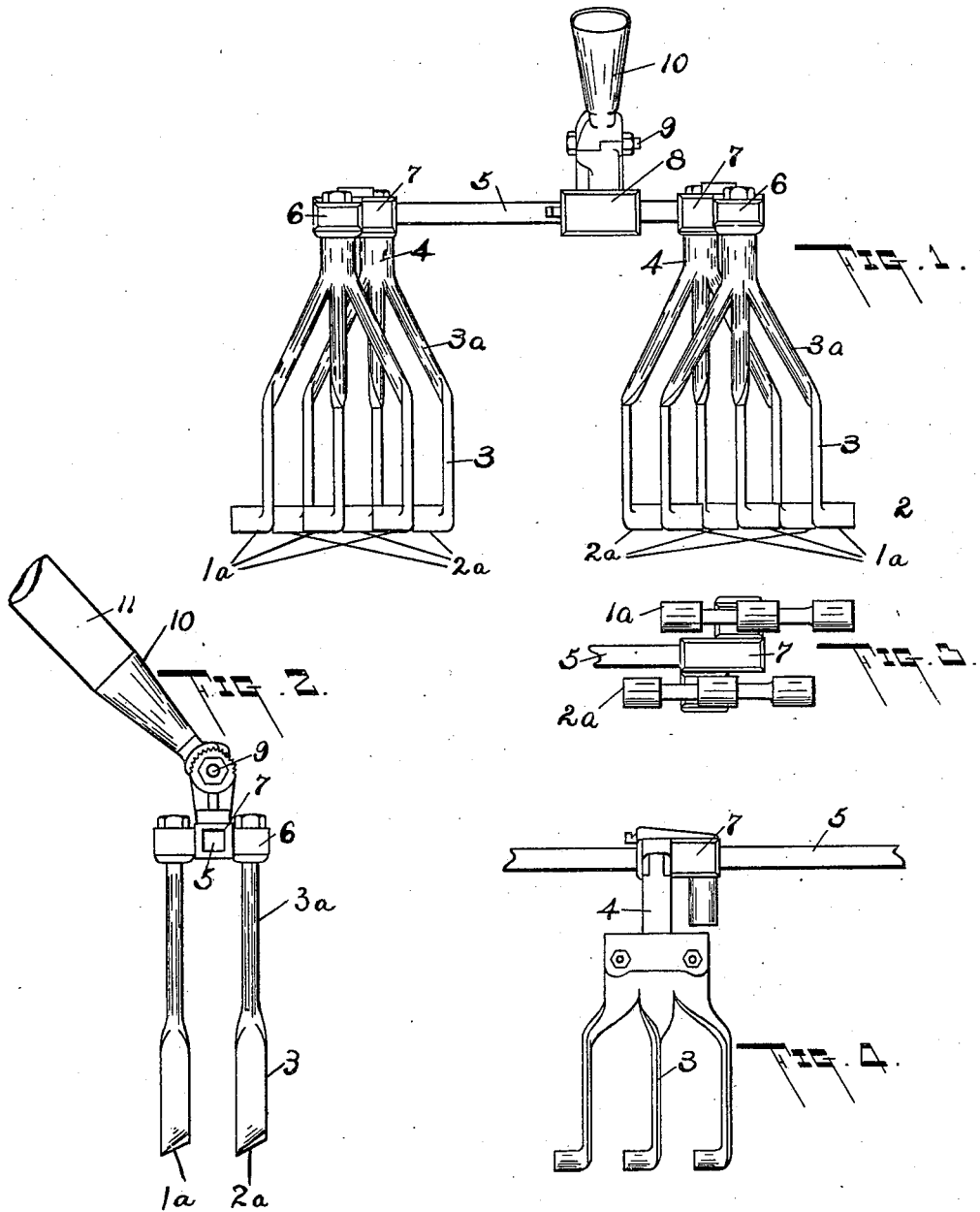

No. 725,768. PATENTED APR. 21, 1903.
A. P. PREVOST.
WEEDING TOOL.
APPLICATION FILED AUG. 11, 1902.
NO MODEL. 2 SHEETS—SHEET 2.
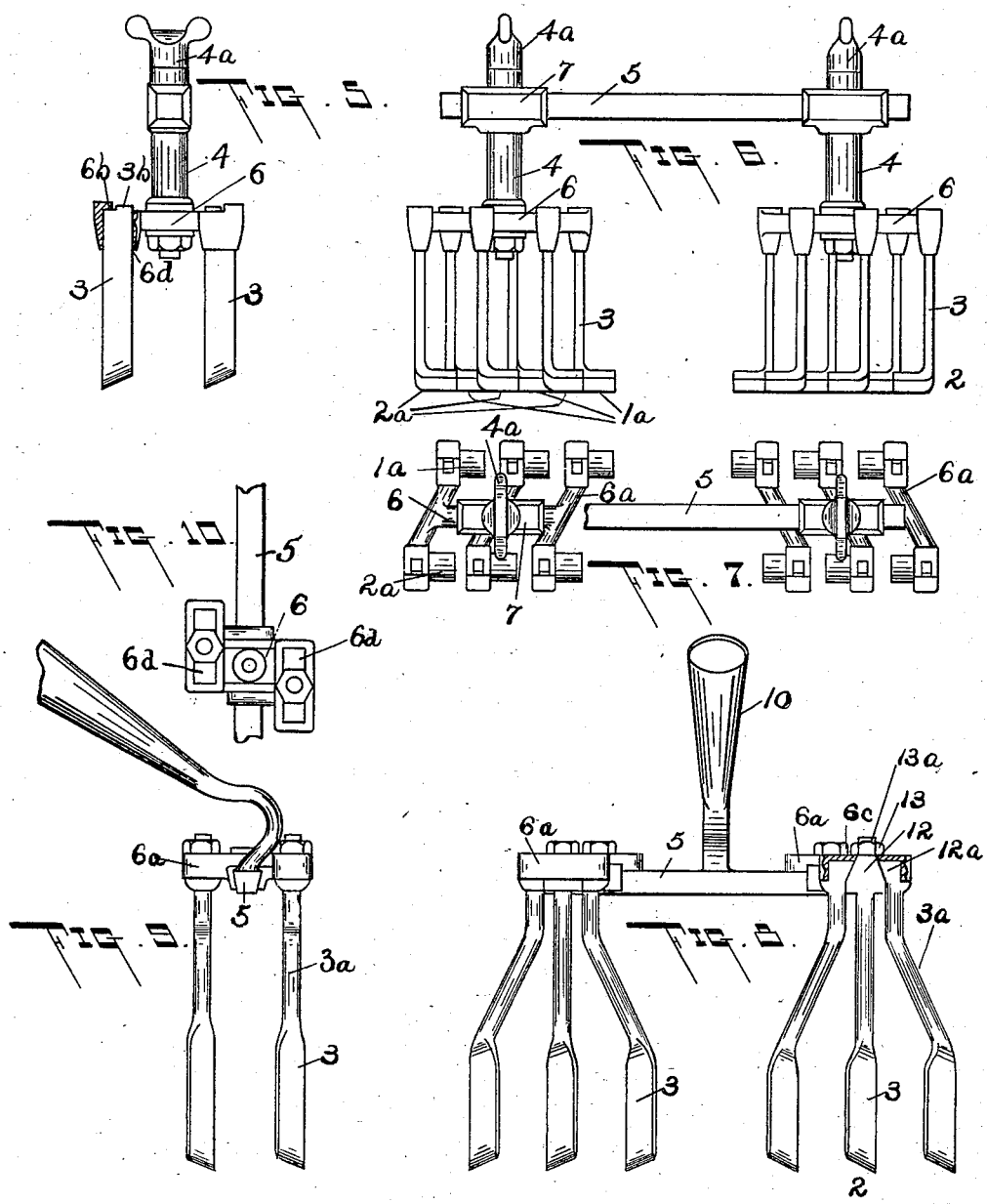
WITNESSES:
James C. Hanson
Frank Martindale
August P. Prevost INVENTOR
BY
Geo. B. Willey ATTORNEY

UNITED STATES PATENT OFFICE.

AUGUST P. PREVOST, OF MONITOR TOWNSHIP, MICHIGAN.

WEEDING-TOOL.

SPECIFICATION forming part of Letters Patent No. 725,768, dated April 21, 1903.

Application filed August 11, 1902. Serial No. 119,250. (No model.)

*To all whom it may concern:*

Be it known that I, AUGUST P. PREVOST, a citizen of the United States, residing at Monitor township, in the county of Bay and State of Michigan, have invented certain new and useful Improvements in Weeding-Tools; and I do hereby declare the following to be a full, clear, and exact description of the invention, such as will enable others skilled in the art to which it appertains to make and use the same.

This invention is a weeding-tool especially adapted for weeding sugar-beets, potatoes, corn, and similar crops.

The objects of the invention are to provide a weeding-tool to be operated by a to-and-fro or shuffling movement similar to that employed in operating the common shuffle-hoe to be so constructed and arranged that the soil around the beets is freed of weeds and the surface of the soil is cut into fine pieces and thoroughly agitated instead of being displaced in large chunks, as is the case when a hoe having a single flat blade is used.

Another object is to provide means for adjusting the sets of cutting-blades toward or from each other to suit various sizes of plants.

I accomplish these objects and certain others, which will further appear in this specification, by the means herein described, and illustrated in the accompanying drawings, to which reference is had.

Figure 1 is a front elevation of my improved weeding-tool. Fig. 2 is a side view. Fig. 3 is a bottom view of one of the sets of blades shown in Fig. 1. Fig. 4 is a side view showing a modified form of blade. Fig. 5 is an end view of a set of detachable blades, showing their manner of attachment to the blade-supporting bracket, the bracket being broken away in parts. Fig. 6 is a front elevation of a pair of cutting sets similar to those shown in Fig. 1, but having their points turned inwardly and being detachably mounted upon their supporting-brackets. Fig. 7 is a top plan view of the parts shown in Fig. 6. Fig. 8 is a front elevation, broken away in parts, showing a modified form of blade and its method of attachment to the bracket. Fig. 9 is an end view of the parts shown in Fig. 8. Fig. 10 is a top view of the parts shown in Fig. 9.

As is clearly shown in the drawings, the weeding-tool consists in two independent sets of small knives or hoes 1 and 2, having upwardly-extending shanks 3, which are secured at their upper ends to vertical standards 4. These standards are slidably mounted upon a horizontal cross-bar 5, so that the sets of hoes 1 and 2 can be adjusted closer together or separated from each other, as desired. This adjustment is essential to adapt the weeding-tool for use in weeding either small or large plants. I have constructed the tool as shown in Fig. 1, in which the shanks 3 are connected to the standards 4 by converging bars $3^a$ integral with the hoes; but in practice I prefer to attach the shanks 3 to the standards 4 in the manner shown in Figs. 5, 6, and 7, where 6 is a horizontal frame or bracket secured to the lower end of the standard 4 and having laterally-extending arms $6^a$, to the extremities of which the upper ends of the shanks 3 are fastened. Each of the standards 4 is fixed in a slotted socket 7, slidably mounted upon a cross-bar 5. The socket 7 is secured to the cross-bar 5 by a thumb-screw $4^a$.

Secured to the middle of the cross-bar 5 is a socket 8, to which is secured, by means of the pivoted joint 9, a socket 10, that receives the end of the hoe-handle 11, by which the hoe is operated. By means of this joint 9 the inclination of the hoe-handle may be adjusted to suit the height of the operator, so that the cutting edges of the tool may be always horizontal.

The operation of the weeding-tool is as follows: The sets of knives 1 and 2 are adjusted upon the bar 5 to such a distance apart as will best suit the size of the plants to be weeded, and the inclination of the handle 11 is adjusted by means of the pivot 9 to the proper height to suit the operator. The hoe is then drawn forward so that the plant is passed between the two sets of hoes 1 and 2, which remove the weeds each side of the plant. The movement is then repeated in a direction approximately at right angles to the first cut, removing the weeds from the two remaining sides.

In weeding plants with bushy tops, such as sugar-beets, the construction of the tool gives the leaves ample room to pass between the standards 4 above the sets of knives 1 and 2, and the leaves are therefore not bruised or injured by the tool.

As is shown in Figs. 1, 2, and 6, each individual blade or hoe of the sets 1 and 2 is inclined upwardly and rearwardly from its front cutting edge, so that the under surface of the blade does not rub along the ground. In Figs. 1, 3, 6, and 7 the sets of blades 1 and 2 are composed of two rows $1^a$ and $2^a$, although more than two rows may be used, if desired, and the knives or hoes of one set are staggered with reference to those of the other set, thereby insuring that all of the ground passed over will be thoroughly worked.

In Fig. 5 I have illustrated a preferred means of attaching the shank 3 to the bracket 6 by providing a bracket with a slot $6^d$, having an inward flange or projection $6^b$ at its upper end. The end of the shank 3 has a boss $3^b$, which projects slightly above the top of the bracket and is riveted over to prevent the shank from loosening.

In Fig. 8 I have illustrated a modified form of attachment between the bars $3^a$ and the bracket 6, consisting in providing a tapered end 12 for the central bar and correspondingly-beveled ends $12^a$ for the two outer bars, all three fitting the socket $6^c$ of the bracket 6 and being locked into position by means of the nut 13, secured upon the threaded end $13^a$ of the central bar.

Fig. 4 shows a set of three hoes formed of a single piece of sheet metal instead of being built up of detachable blades.

What I claim as my invention, and desire to secure by Letters Patent, is as follows:

1. A weeding-tool comprising in combination, a cross-bar, a handle slidably adjustable along said cross-bar, a pair of sockets carried by and adjustable along said bar, a set of hoes carried by each socket, each set of hoes consisting in a row of substantially horizontal cutting-blades inclined upwardly at their rear ends and a second row of cutting-blades in the rear of the first row, all arranged substantially as described.

2. A weeding-tool comprising in combination, a cross-bar, a handle secured to said cross-bar, a set of hoes slidably mounted on said bar at each side of said handle, each set of hoes consisting in a row of substantially horizontal cutting-blades inclined upwardly at their rear ends, and a second row of cutting-blades in the rear of the first row.

In testimony whereof I affix my signature in presence of two witnesses.

AUGUST P. PREVOST.

Witnesses:
FRANK MARTINDALE,
NELLIE PRENDIVILLE.